United States Patent [19]
Papalardo

[11] 3,978,583
[45] Sept. 7, 1976

[54] PEELING UTENSIL

[76] Inventor: William A. Papalardo, 63 Little Neck Road, Centerport, N.Y. 11721

[22] Filed: Apr. 7, 1975

[21] Appl. No.: 565,832

Related U.S. Application Data

[63] Continuation-in-part of Ser. No. 441,132, Feb. 11, 1974, Pat. No. 3,885,307.

[52] U.S. Cl. .............................. 30/123.5; 99/570
[51] Int. Cl.² ......................................... A47J 17/02
[58] Field of Search .............. 30/123.5, 279 R, 283, 30/356, 113.1, 278, 282, 113.2, 113.3, 123.6, 123.7; 99/588, 590

[56] References Cited
UNITED STATES PATENTS

| 1,230,123 | 6/1917 | Connelly | 30/113.1 |
|---|---|---|---|
| 2,022,954 | 12/1935 | Cook | 30/123.5 |
| 2,073,546 | 3/1937 | Baker | 30/283 |
| 3,299,510 | 1/1967 | Taormina | 30/279 R |

FOREIGN PATENTS OR APPLICATIONS

| 489,536 | 7/1938 | United Kingdom | 30/279 R |

Primary Examiner—Al Lawrence Smith
Assistant Examiner—J. C. Peters
Attorney, Agent, or Firm—Schiller & Pandiscio

[57] ABSTRACT

The invention is an article useful in assisting removal of peels from fruits and vegetables and having a generally elongated handle and a blade having a substantially convex bottom surface attached at one end thereof to a handle. The blade has an open ended slot extending from the other end of the blade for a distance along its long axis. The slot edges are concave at least in part, and are sharpened downwardly and inwardly to form cutting edges on the convex bottom surface of the blade.

14 Claims, 7 Drawing Figures

PEELING UTENSIL

This invention is a continuation-in-part of my copending Application Ser. No. 441,132, filed Feb. 11, 1974 now U.S. Pat. No. 3,885,307, issued May 27, 1975.

This invention relates to an article useful in assisting removal of peels from fruits and vegetables, and more particularly to hand-held utensils for peeling a variety of fresh fruits and vegetables.

Various utensils known in the art for coring and removing peels from fresh fruits and vegetables have disadvantages. Known utensils are generally designed for use on just a single variety, or at most a few varieties of fruits and vegetables, requiring a housewise to acquire a number of utensils. For example, devices such as the "rocking movement" peelers shown in Fender U.S. Pat. No. 2,232,941 and in Gamache U.S. Pat. No. 2,362,896 are believed to be quite useful for peeling raw potatoes and have achieved substantial consumer acceptance. However, such devices are believed to be decidedly less suited for peeling other fruits and vegetables such as apples and tomatoes. A further disadvantage is the tendency to clog during use which is annoying and not easy to clear up. Also, such devices are not particularly suitable for coring apples, and are also substantially unsuited for peeling citrus fruits such as oranges and the like. Other devices known in the art for peeling and/or coring selected fruits or vegetables such as Hayward, U.S. Pat. No. 1,213,361 (Apple Corer), Sale, British Pat. No. 657,602 (Citrus Fruit Peeler), Brock, U.S. Pat. No. 193,220 (Apple Parer and Corer) also have limited utility, for example, are believed not particularly suited for peeling raw potatoes. Also, for some varieties of fruits and vegetables there are no utensils designed to assist peeling, e.g. peaches and pears. To peel such varieties a housewife may resort to using a straight blade knife. As will be appreciated such practice may be hazardous and is undesirable and may result in loss of pulp and juice.

The primary object of this invention is to provide a new article useful in assisting removal of peels from a variety of fruits and vegetables.

A further object is to provide such a utensil that is also useful for coring a variety of fruits and vegetables without appreciable clogging.

A still further object is to provide such a utensil that is relatively simple, can be hand held, and which is easy and safe to handle and store.

The foregoing and other objects are achieved by a preferred embodiment of the invention which consists of a utensil comprising a generally elongated handle and a blade having a substantially convex bottom surface attached at one end thereof to a handle. The blade has an open ended slot extending from the other end of the blade for a distance along its long axis. The slot edges are concave at least in part, and are sharpened downwardly and inwardly to form cutting edges on the convex bottom surface of the blade. In a preferred embodiment of the invention the blade outside edges are concave at least in part, and the blade is curved downwardly in longitudinal section for a distance.

Other features and many of the attendant advantages of the invention are described or rendered obvious by the following detailed description which is to be considered together with the accompanying drawings wherein.

Figure 1:
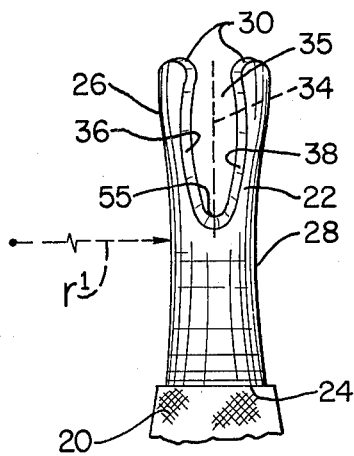
FIG. 1 is a top plan view of one embodiment of utensil of the present invention.
Figure 2:
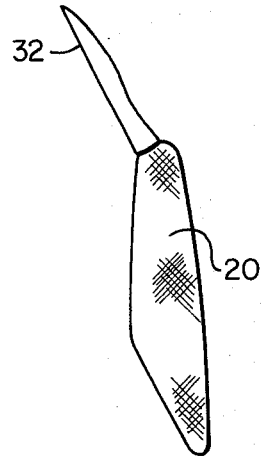
FIG. 2 is a left side elevational view of the utensil of FIG. 1.
Figure 6:
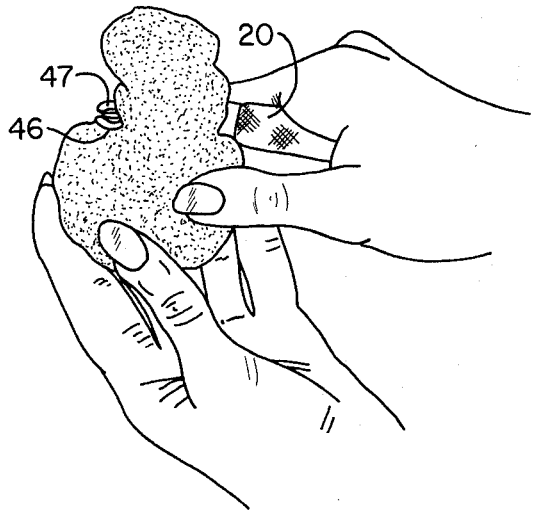
FIG. 6 is a perspective view of the utensil according to the present invention showing a peeling operation on an orange.
Figure 3:
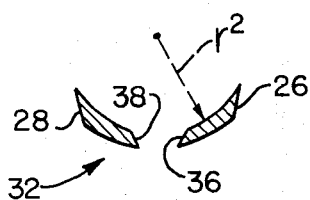
FIG. 3 is a cross-sectional view taken along line 3—3 of FIG. 4.

Referring now to FIGS. 1-3, the illustrated utensil comprises a generally elongated handle 20 formed of metal, wood or a high impact polymeric material or the like. The handle is of size and shape adapted to be hand-held, e.g. as shown in FIG. 6. Although handle 20 is shown as a tapered elongated body, it is to be understood that the handle can have a variety of shapes and can be, for example, substantially flat, and it may be hollow or solid.

Attached to one end of handle 20 (formed integrally therewith, or attached by suitable means) is a blade 22. Blade 22 comprises an elongate body comprising a base 24, side edges 26 and 28, front edges 30 and bottom 32.

One or both side edges of the blade are curved inwardly over a distance relative to the long axis of the blade. That is, one or both side edges are concave at least in part. The blade may have generally concave side edges substantially along its length, e.g. edges 26 and 28 in FIG. 1. Preferably, edges 26 and 28 are curved inwardly with a substantially constant curvature over a distance with a radius $r^1$ in the range of from about 2½ to 12 inches. In FIG. 1 edges 26 and 28 are symmetrical curves about the long axis 34 of the blade; however it will be understood that the edges 26 and 28 may be asymmetrical about axis 34. If desired, the blade side edges may also be convex in part, e.g. FIG. 4 at 47 and 48. The important thing is that the blade side edges are generally concave for at least a part of the blade length.

Blade 22 has an open slot 35 running longitudinally from front edge 30 of the blade for a distance towards base 24. Preferably slot 35 extends for from about 50% to 75% of the length of the blade. Slot 35 may be somewhat longer than 75% of the length of the blade but this may tend to weaken the blade to some extent. The slot edges are spaced from one another and have facing concavities at least in part along their length and have a relatively narrow opening or space adjacent the blade front edges 30, and a wider opening adjacent the slot mid point, e.g. as at 36 and 38. The slot tapers from its widest points to its closed end 55. The slot should be relatively narrow with respect to the average width of the blade, e.g. for a blade which is about ¾ – 1½ inch wide, slot 35 generally will be not more than about 5/16 – ⅝ inch at the front edge 30, the slot may be about 7/16 – ⅞ inch at its widest point along the concave edges, e.g. at 36, and the slot may be only about ⅛ – ¼ inch at its closed end 40. Obviously, slot 35 may be somewhat wider; however, this may tend to weaken the blade to some extent.

A critical requirement of this preferred embodiment of the invention and a particular advantage of the invention resides in how the slot edges are sharpened. Slot edges 36 and 38 are sharpened downwardly and inwardly to form cutting edges on the convex bottom surface 32 of the blade. These edges may be honed to quite sharp edges, e.g. as sharp as a pairing knife or even sharper. However, it will be appreciated that there is little change the one using the utensil may be cut from these sharp edges 36 and 38 since they are substantially shielded by the shape of the blade. Blade outside edges 26 and 28 are sharpened upwardly and outwardly to make cutting edges on the concave surface of the blade. However, from safety considerations these edges are desirable not too sharp. Furthermore side edges 26 and 28 need not be particularly sharp to be useful as will become clear from the description following. An important requirement however, is that side edges 26 and 28 should be sharpened upwardly and outwardly, i.e., in a direction opposite to the direction the respective adjacent slot edges 36 and 38 are sharpened.

The side edges 26 and 28 are blended together at the open end of the slot at front edge 30 of the blade. Thus, it is seen in that the exposed edges of the blade are relatively dull, while the sharp edges are substantially shielded by the shape of the blade. This is an obvious advantage from safety considerations. Also, the multiple types of peeling and coring jobs possible using this one utensil are achieved by the requirements indicated herein.

As shown particularly in FIG. 3 the bottom surface 32 of the blade is rounded in a generally convex shape. That is bottom surface 32 curves generally upwardly from the long axis 34 to side edges 26 and 28. Preferably the bottom 12 is curved upwardly with a substantially constant curvature over a distance with a radius of $r^2$ in the range of from about ½ inch to 3 inches. As will be clear from the description following the generally convex shape bottom surface 32 of the blade orients the blade so that while one edge, for example, side edge 26, is used to scrape the fruit or vegetable, the other side edge 28 diverts the scrappings.

Figure 4:
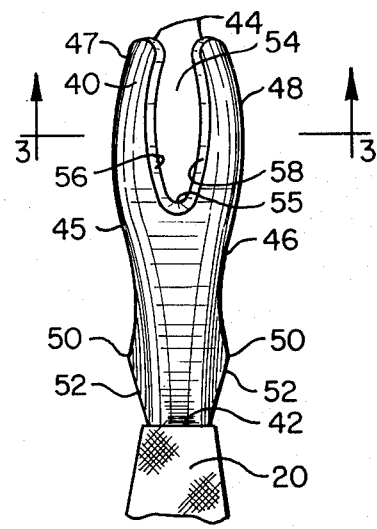
FIG. 4 is a fragmentary top plan view of still another modification and preferred embodiment of the invention.
Figure 5:
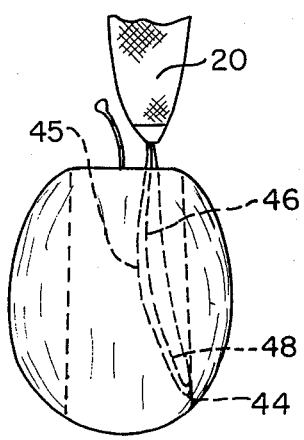
FIG. 5 is a left side view of the utensil according to the modification of FIG. 4, and showing using the utensil in a coring operation on an apple.

Referring to FIGS. 4 and 5 there is shown an alternative and preferred embodiment of utensil of the invention which is useful for peeling and coring a variety of fruits and vegetables. As distinguished from the utensil shown in FIGS. 1 – 3 which is a substantially straight blade, the utensil shown in FIGS. 4 and 5 has a blade 40 which is curved in longitudinal section, i.e., downwardly relative to the handle from the blade base 42 to the blade front edges 44. As seen in FIG. 5 the curvature is greatest adjacent the blade front edges 44, and the blade is substantially straight for a distance adjacent the handle.

As previously described the blade side edges have convex sections 47 and 48 and concave sections 45 and 46.

Side edges 45 and 46 run to a shoulder portion 50, and the blade then tapers at 52 to base 42. As will become clear from the description following the taper 52 forms a surface or rest for a finger or thumb of the user. Preferably the blade is widest in cross section at a point on the convex edges with shoulder portion 52 at its widest point 50, not quite so wide. The remainder of the blade is somewhat narrower, which facilitates coring and peeling as will become clear from the description following.

Also in this preferred embodiment blade 40 has an open slot 54 running longitudinally from the front edge 44 of the blade for a distance towards base 42. Slot 54 is similar to slot 34 (FIG. 1) and thus has concave side edges 56 and 58. Sharpening of the slot edges 56 and 58 is also as before. The blade side edges 45, 46, 47 and 48 like edges 26 and 28 (FIG. 1) are also sharpened to some extent, and as previously mentioned, for safety considerations these edges are desirably not too sharp. Furthermore, side edges 45, 46, 47 and 48 need not be particularly sharp to be useful as will become clear from the description following. An important requirement however, is that side edges 45, 46, 47 and 48 should be sharpened upwardly and outwardly, i.e., as edges 26 and 28 (FIGS. 1 – 3) previously described. Obviously shoulder portion 52 need not and should not be sharpened.

The side edges 45, 46, 47 and 48 and the sharpened slot edges 56 and 58 are blended together at the open end of the slot at front edge 44 of the blade. Thus, it is seen that the exposed edges of the blade are relatively dull, while the sharp edges are substantially shielded by the shape of the blade. This is an obvious advantage from safety considerations. Also, the multiple types of peeling and coring jobs possible using this one utensil are achieved by the requirements indicated herein.

A description of the operation of the utensil thus described will be helpful in delineating the inventive concepts involved. Referring to FIG. 5 there is shown the use of the utensil illustrated in FIGS. 4 and 5 for coring a fruit or vegetable such as an apple. The utensil is held in one hand by handle 20 and it is pushed and rotated into the apple (held in the other hand). The front edges 44 of the blade pierce the apple skin and act as the leading cutting edge. Side edges 47 and 48, and slot edges 56 and 58 slice (and trail) through the apple as the utensil is pushed and rotated through the apple. A particular advantage of the invention is evident from using the utensil for coring. One might expect that the downward curve (in longitudinal section) of the blade may interfere with the coring operation. However, this shape unexpectedly makes coring relatively easy since this results in a hole being made which is somewhat greater in diameter than the width of the blade. As a result the utensil is less likely to bind as it is pushed through the fruit or vegetable.

Referring to FIG. 6 there is shown the use of the utensil shown in FIG. 4 for peeling a relatively thick skin fruit or vegetable such as an orange. The utensil is held in one hand, e.g. the right hand by handle 20, and the user's forefinger rests on shoulder 52. The orange is held in the other hand. The orange and the utensil are moved relative to each other, e.g. as by pressing upwardly with the right hand thumb. Edge 46 peels the skin from the orange, which is diverted by edges 45 and 47.

One skilled in the art will recognize a number of advantages of the utensil of the invention. For one thing the longitudinal concave curved shape of the blade conforms generally to the convex surface of most fruits or vegetables. This conformation, coupled with the concave curved side edges provides a relatively long scraping edge, and this will result in rapid removal of the peels. Also, the convex curved bottom edge "rolls" the side scraping edge (e.g. edge 26 in FIG. 1 and edge 45 in FIG. 4) away from the fruit or vegetable being peeled which may reduce the possibility that the scraping edge may cut into the fruit or vegetable and the resultant loss of juice and pulp. Another advantage is that the utensil blade has relatively blunt exposed side edges (26 and 28 in FIG. 1 and 45, 46, 47 and 48 in FIG. 4), thus making the utensil safe to store and use. Also, since the utensil has relatively blunt side edges it is less likely that the utensil will cut into the pulp of the fruit or vegetable which is being peeled, and result in an undesirable loss of juice and/or pulp.

An additional advantage in making the widest point of the blade on the convex section, e.g. at 47 and 48, is that this tends to orient the peeling action of the outer edges per se toward the user, which results in the least resistance in use. Better control and ease in peeling results.

Still another advantage is that the utensil is useful for peeling a variety of fruits and vegetables. By way of example, even though the utensil may have relatively dull side edges (26 and 28 in FIG. 1 and 45, 46, 47 and 48 in FIG. 5) these may be advantageously used to peel many relatively thick skinned fruits and vegetables such as oranges, grapefruits, lemons, tangerines, mangos, papayas, avacados and mushrooms.

Figure 7:
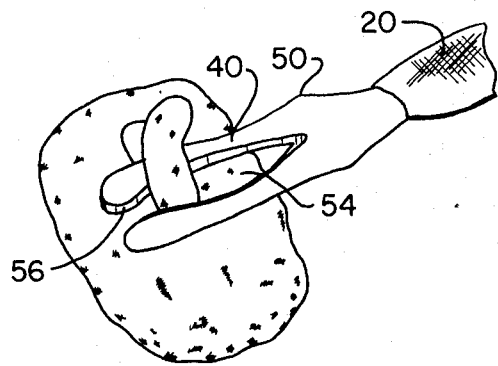
FIG. 7 is a perspective view of the utensil according to the modification of FIG. 4, and showing a peeling operation on a potato.

Referring to FIG. 7 there is shown use of the utensil illustrated in FIG. 4 for peeling the skin from a relatively thin skinned fruit or vegetable such as a potato. The utensil is held in one hand by handle 20 and is inclined relative to the potato (held in the other hand) so that one of the sharp inner edges of the open slot, e.g. edge 56 engages the skin of the potato, and the other slot cutting edge, e.g. edge 58 is spaced from the skin of the potato a short distance. The utensil is brought across the surface of the potato whereby edge 56 cuts into the surface of the potato, and a slice of potato peeling will pass upwardly through slot 54. One skilled in the art will recognize another advantage of the invention. As is well known, slotted peelers such as described in Fender U.S. Pat. No. 2,232,941 and in Gamache U.S. Pat. No. 2,362,896 are prone to become clogged with parings. To remove clogged parings from the slots of such prior art peelers the user typically must lay the vegetable aside, and the freed hand is then used to extract the clogged peels from the slot. Even then some of the peelings in the slot may require some effort to remove them entirely. With the instant peeler it is a relatively simple matter to remove any peelings from the slot, since an outward motion of the index finger of the hand holding the object to be peeled may be used while the object being peeled is still held in that hand. In practice, the overall tapered shape of the open slot tends to be self-cleaning and minimizes any clogging. A still further advantage provided by the taper shaped slot is that this allows the user to have some control over the thickness of the peeling. That is, the user can obtain a relatively thin peel by taking the peeling at the narrower end of the slot, or a wider peel may be taken at the wider end of the slot. Also, the longitudinal downward curve of the blade helps to conform the inner edges of the slot to the generally convex surface of the vegetables or fruits being peeled. Also, the concave curved shape of the slot conforms generally to the convex surface of most fruits or vegetables. This confirmation provides a relatively long scraping edge, and this will result in rapid removal of the peels.

Other changes will be obvious to persons skilled in the art. For example, if desired only one of the side and/or slot edges, (e.g. 26 or 36 in FIG. 1, or 45 or 56 in FIG. 4) may be curved or concaved inwardly, and the other edge (e.g. 28 and 38 in FIG. 1 or 46 and 58 in FIG. 4) may be substantially straight. However, it is preferred that both side edges and both slot edges be concave, and also that the blade is symmetrical about its longitudinal axis so that the utensil may be used in either hand.

Still other changes obvious to persons skilled in the art are possible without departing from the main premises of the invention.

I claim:

1. A peeling utensil comprising an elongated handle and an elongated blade having a substantially convex bottom surface attached at one end thereof to said handle, said blade having an open ended slot extending for a distance from the other end of said blade, at least one side edge of said slot concave at least in part over its length, and said slot edges are sharpened downwardly and inwardly to form cutting edges on said convex bottom surface of said blade.

2. Utensil according to claim 1 wherein said blade is also curved downwardly over a distance.

3. Utensil according to claim 2 wherein said blade is curved downwardly with a substantially constant curvature over a distance, said curvature having a radius in the range of between about 6 and 18 inches.

4. Utensil according to claim 1 wherein the blade side edges are curved with a substantially constant curvature over a distance.

5. Utensil according to claim 4 wherein said curvature has a radius in the range of between about 2½ and 12 inches.

6. Utensil according to claim 1 wherein the blade side edges also include a tapered shoulder portion adjacent the handle end of said blade.

7. Utensil according to claim 6 wherein said blade is substantially symmetrically about its long axis.

8. Utensil according to claim 6 wherein said blade bottom surface is convex upwardly from the long axis of the blade with a substantially constant curvature over a distance with a radius in the range of between about ½ inch and 3 inches.

9. Utensil according to claim 6 wherein said slot has an overall taper from its said open end.

10. Utensil according to claim 6 wherein the blade side edges are sharpened upwardly and outwardly in a direction opposite to the direction said slot edges are sharpened, and are blended with said sharpened slot edges adjacent the open end of said slot.

11. Utensil according to claim 6 wherein the blade side edges also include a convex portion at least in part adjacent the open slot end of said blade.

12. Utensil according to claim 6 wherein said blade is widest in cross section at a point on said convex portion.

13. Utensil according to claim 6 wherein the blade side edges include a convex portion at least in part adjacent the open slot end of said blade, and a concave portion at least in part between said convex portion and said shoulder end of said blade.

14. Utensil according to claim 13 wherein said blade is broadest at said convex portion.

* * * * *